United States Patent
Cook et al.

(10) Patent No.: US 7,882,153 B1
(45) Date of Patent: Feb. 1, 2011

(54) METHOD AND SYSTEM FOR ELECTRONIC MESSAGING OF TRADE DATA

(75) Inventors: Scott D. Cook, Woodside, CA (US); Daniel Wernikoff, Portola Valley, CA (US)

(73) Assignee: Intuit Inc., Mountain View, CA (US)

( * ) Notice: Subject to any disclaimer, the term of this patent is extended or adjusted under 35 U.S.C. 154(b) by 1009 days.

(21) Appl. No.: 11/712,758

(22) Filed: Feb. 28, 2007

(51) Int. Cl.
*G06F 17/30* (2006.01)

(52) U.S. Cl. .............................. 707/811; 707/E17.058; 705/40

(58) Field of Classification Search .......... 707/999.101, 707/999.107, 811, E17.058; 705/40
See application file for complete search history.

(56) References Cited

U.S. PATENT DOCUMENTS

| | | | |
|---|---|---|---|
| 4,264,808 A | 4/1981 | Owens et al. | |
| 5,878,141 A | 3/1999 | Daly et al. | |
| 6,173,272 B1 | 1/2001 | Thomas et al. | |
| 6,721,716 B1 | 4/2004 | Gross | |
| 7,584,256 B2 * | 9/2009 | Osborne et al. | 709/206 |
| 2001/0034724 A1 | 10/2001 | Thieme | |
| 2002/0138426 A1 | 9/2002 | Craddick | |
| 2004/0210526 A1 | 10/2004 | Brown | |
| 2005/0044197 A1 | 2/2005 | Lai | |
| 2005/0273772 A1 * | 12/2005 | Matsakis et al. | 717/136 |
| 2005/0289182 A1 * | 12/2005 | Pandian et al. | 707/104.1 |
| 2007/0011183 A1 * | 1/2007 | Langseth et al. | 707/101 |
| 2007/0112714 A1 * | 5/2007 | Fairweather | 706/46 |
| 2008/0133409 A1 | 6/2008 | Eastley et al. | |

OTHER PUBLICATIONS

Gingrande, A., AIIM User Guide, Processing Unstructured Documents: Challenges and Solutions, Oct. 28, 2005, pp. 1-16.

* cited by examiner

*Primary Examiner*—Leslie Wong
(74) *Attorney, Agent, or Firm*—Osha • Liang LLP

(57) ABSTRACT

A method for electronic messaging of trade data involves receiving trade data having an unknown format in an electronic message, where trade data includes individual trade data elements, processing the electronic message to resolve the unknown format into a known format, parsing trade data using the known format to obtain individual trade data elements, and storing individual trade data elements in a trade data repository.

9 Claims, 6 Drawing Sheets

US 7,882,153 B1

METHOD AND SYSTEM FOR ELECTRONIC MESSAGING OF TRADE DATA

BACKGROUND

Businesses of all sizes frequently send and receive trade documents with other businesses. Examples of trade documents include invoices, payment notices, purchase orders, change requests, medical records, etc. Many different types of trade documents exist. Trade documents allow businesses to formalize transactions of money, goods and services, and may also be used to create an audit trail for such transactions. Trade documents may also be exchanged between business groups within an individual business.

Historically, trade documents have been generated in paper format and transmitted via so-called "snail mail" services. More recently, widespread business computing and networking technologies have allowed for trade documents to be converted to trade data (i.e., electronic representations of trade documents) and transmitted electronically. To do so, a sender and a recipient (i.e., different businesses or business groups within an individual business) typically agree on a standard trade data format, and must then use messaging applications that support the standard natively, and/or develop interfaces for other messaging applications to support the standard.

Electronic Data Interchange (EDI) defines one such set of standards. Specifically, EDI defines the structures, character sets, and data elements required for various types of trade data. Further, EDI Implementation Guidelines provide specifications for implementing EDI support. Developing software to satisfy the EDI Implementation Guidelines requires abundant resources, effort, and locks businesses into using specific trade data formats. Many businesses lack the financial overhead, manpower, and/or inclination to successfully adopt EDI standards.

SUMMARY

In general, in one or more aspects of the invention, the invention relates to a method for electronic messaging of trade data. The method comprises receiving trade data having an unknown format in an electronic message, wherein trade data comprises individual trade data elements, processing the electronic message to resolve the unknown format into a known format, parsing trade data using the known format to obtain individual trade data elements, and storing individual trade data elements in a trade data repository.

In general, in one or more aspects of the invention, the invention relates to a system for electronic messaging of trade data. The system comprises a trade data format repository configured to store a plurality of trade data formats, and a trade data processor. The trade data processor is configured to receive trade data having an unknown format, process trade data to resolve the unknown format into a known format selected from the plurality of trade data formats, and transmit the known format in response to trade data.

In general, in one or more aspects of the invention, the invention relates to a computer readable medium comprising executable instructions for electronic messaging of trade data. The computer readable medium comprises executable instructions for electronic messaging of trade data to receive trade data having an unknown format in an electronic message, wherein trade data comprises individual trade data elements, process the electronic message to resolve the format into a known format, parse trade data using the known format to obtain individual trade data elements, and store individual trade data elements in a trade data repository.

Other aspects of the invention will be apparent from the following description and the appended claims.

DETAILED DESCRIPTION

Figure 1:
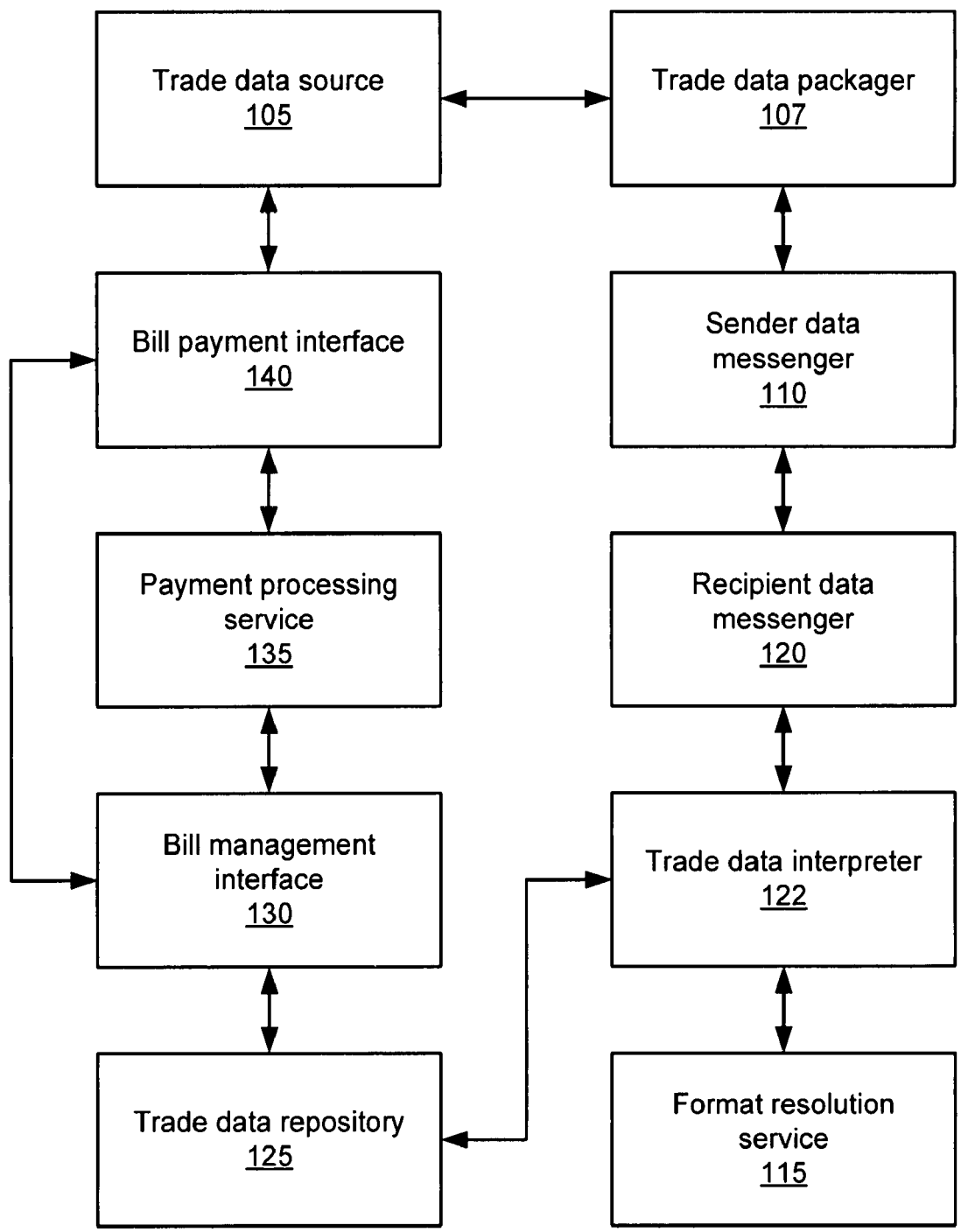
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for electronic messaging of trade data. Trade data is received in an electronic message, where the format of the trade data is unknown. The electronic message is processed to resolve the unknown format into a known format, thereby allowing individual trade data elements to be obtained from the trade data. In one or more embodiments, processing the electronic message involves comparing the trade data to previous user contributions of trade data mappings.

FIG. 1 shows a diagram of a system in accordance with one or more embodiments of the invention. Specifically, the system is configured to allow electronic messaging of trade data and/or electronic bill payment. Although compatible, electronic messaging of trade data and electronic bill payment are distinct concepts and both need not be present. Thus, embodiments of the invention need not include all of the elements shown in FIG. 1. Nonetheless, for descriptive purposes, electronic messaging of trade data and electronic bill payment are discussed herein as collaborative aspects of a unified system.

As shown in FIG. 1, electronic messaging of trade data is performed between a sender data messenger (110) and a recipient data messenger (120). The sender data messenger (110) and the recipient data messenger (120) may be email applications, web services, proprietary messaging applications, any other type of electronic messaging facility, or any combination thereof. For example, the sender data messenger (110) and/or the recipient data messenger (120) may be part of an accounting application, an asset management application, a document management service, or any other type of application typically used to generate, process, and/or store trade data. Further, an intermediary server (not shown) may be used to provide messaging services, such as spam filtering, guaranteed delivery, delivery confirmation, trust certification, etc. The intermediary server may also act as a central repository of trade data, essentially acting as a middleman for communications between senders and recipients.

The sender data messenger (110) and the recipient data messenger (120) may be of different types, as long as the messengers are able to communicate with each other. Further, the sender data messenger (110) and the recipient data messenger (120) may be located on the same network (e.g., a wide area network (WAN), a metropolitan area network (MAN), a local area network (LAN), a public network such as the Internet or World Wide Web, or any combination thereof) or on separate networks (e.g., distinct LANs separated by other network types). Those skilled in the art will appreciate that the sender data messenger (110) may also be configured to receive electronic messages, and the recipient data messenger (120) may also be configured to send electronic messages.

In one or more embodiments, the sender data messenger (110) is configured to transmit an electronic message including trade data (not shown but described below) to the recipient data messenger (120). Specifically, the transmitted trade data includes individual trade data elements encoded therein. Examples of individual trade data elements include individual names, company names, department titles, dates, balances, debts, stock keeping unit (SKU) numbers, order quantities, stock quantities, prices, serial numbers, discount information, any other type of information generally included in trade documents, or any combination thereof. The electronic message may be an email, a remote procedure call, a query to a web service, any other type of electronic message that allows communication between computer systems, or any combination thereof.

In one or more embodiments, trade data is obtained from a trade data source (105). The trade data source (105) may be a database, a spreadsheet, a web page, a scanned document, a data file, any other type of data source configured to provide trade data, or any combination thereof. For example, trade data may be obtained from a database communicatively coupled (either directly or indirectly) with an accounting application, an asset management application, or a document management service. Further, multiple trade data sources (not shown) may be used. Alternatively, trade data may be entered into the electronic message manually, i.e., via an input device such as a keyboard or mouse. Supporting manual entry may facilitate adoption of electronic messaging of trade data, particularly for businesses that lack extensive back-end infrastructures (i.e., network equipment, one or more servers, databases, etc.). In one or more embodiments, a combination of trade data from manual entry and a trade data source (105) is used.

If a trade data source (105) is used, a trade data packager (107) may be configured to format the trade data from the trade data source (105) for electronic transmission. The trade data packager (107) may be a module of an accounting application, a plug-in to an email application, a background service executing in an operating system, or any other type of intermediary component. The trade data packager (107) may format the trade data using an EDI standard format, a tag-based language, an extensible markup language (XML) schema, comma-separated values (CSV), a spreadsheet format, any other type of format capable of storing trade data, or any combination thereof. Moreover, the trade data packager (107) may be configured to encrypt the trade data. Whatever formatting is used, the trade data packager (107) is configured to provide the formatted trade data to the sender data messenger (110) for subsequent transmission.

Trade data obtained from a trade data source (105) and formatted using a trade data packager (107) is generally well structured. That is, the relative locations of the individual trade data elements are predetermined and generally consistent across multiple electronic messages of the same type. In contrast, unstructured trade data is trade data where the relative locations of individual trade data elements are not predefined and accordingly may be inconsistent across multiple electronic messages. For example, trade data elements manually entered into an email message in sentence form are likely to be relatively unstructured. Electronic messages may include structured trade data, unstructured trade data, or any combination thereof.

Whether structured and/or unstructured trade data are used, the trade data entered into the electronic message has a particular trade data format. At its most fundamental level, a trade data format is defined by the locations of individual trade data elements in the trade data. Thus, structured trade data generally has a well-defined trade data format, depending principally on the specific trade data source (105) and/or trade data packager (107) used. Unstructured trade data also has a trade data format, though the format is generally not predefined and is more likely to vary across multiple electronic messages.

The recipient data messenger (120) is configured to receive the electronic message from the sender data messenger (110) and provide the electronic message to a trade data interpreter (122) for processing. Specifically, the trade data interpreter (122) is configured to process the electronic message to obtain individual trade data elements encoded therein. The trade data interpreter (122) may be a module of an accounting application, a plug-in to an email application, a background service executing in an operating system, or any other type of intermediary component configured to process electronic messages that include trade data. Further, the trade data interpreter (122) may be the same type of component as the trade data packager (107), or may be of a different type.

In one or more embodiments, the trade data may have an unknown format. That is, at the time the electronic message is received, the trade data interpreter (122) may lack sufficient information about the trade data's format to readily extract individual trade data elements from the trade data. Because the format of the trade data may be unknown, the trade data interpreter (122) is configured to resolve unknown formats into known formats.

In one or more embodiments, to resolve an unknown format into a known format, the trade data interpreter (122) is configured to perform pattern recognition on the trade data. Pattern recognition is discussed in detail below. Alternatively, the trade data interpreter (122) may be configured to interact with a format resolution service (115). The format resolution service (115) is remote to the trade data interpreter (122), i.e., operating on a different computer system, either on the same network or on a different network. Specifically, the format resolution service (115) is a software and/or hardware component configured to execute on a server communicatively coupled with the trade data interpreter (122).

In one or more embodiments, the trade data interpreter (122) is configured to transmit information about the electronic message to the format resolution service (115). The transmitted information may include the entire electronic message, the trade data itself, any other type of information about the electronic message, or any combination thereof. In one or more embodiments, the information includes a sender identifier such the sender's email address, a digital certificate, any other type of information identifying the sender of the electronic message, or any combination thereof.

The format resolution service (115) is configured to process the transmitted information to obtain a known format, and transmit the known format to the trade data interpreter (122) in response to the transmitted information. Depending on the type of information transmitted, the format resolution service (115) may obtain the known format in many different ways. For example, if a sender identifier is provided, the format resolution service (115) may be configured to match the sender identifier with a corresponding known format. Alternatively, the format resolution service (115) may be configured to perform pattern recognition on the trade data. Various embodiments of the format resolution service (115) are discussed in detail below.

In one or more embodiments, the trade data interpreter (122) is configured to request user approval prior to using the known format. Specifically, the trade data interpreter (122) may be configured to display, via a display device (not shown), a suggested mapping of individual trade data elements representative of the known format. Further, the trade data interpreter (122) may be configured to prompt a user, via the display device, to accept or reject the suggestion. Moreover, the trade data interpreter (122) may include an interface by which the user may modify the suggestion, i.e., correct inaccuracies in the mapping of individual trade data elements. In one or more embodiments, providing such an interface allows the trade data interpreter (122) to make a "best guess" effort at determining a known format, while providing safeguards against inaccuracies. Such safeguards may be particularly helpful if unstructured trade data is used.

As discussed above, the unknown format may be resolved into a known format by the trade data interpreter (122) and/or a format resolution service (115). However, in some cases, the trade data interpreter (122) and/or the format resolution service (115) may be unable or configured not to resolve the unknown format into a known format. Thus, one or more embodiments of the invention also allow trade data formats to be entered manually, via a user interface (not shown). Specifically, users may be able to manually indicate the mappings of individual trade data elements to specific locations in the trade data. Further, users may be able to specify keywords that identify common trade data elements (e.g., "date due," "amount," "price," "order number," etc.). The user-specified format may be subsequently transmitted to the format resolution service (115) for storage. Thus, the trade data format becomes a known format and is available for use (e.g., by the community) in processing subsequent electronic messages.

Regardless of how the known format is obtained (i.e., manually or via automated processing), the trade data interpreter (122) is configured to parse the trade data using the known format to obtain individual trade data elements. The trade data interpreter (122) is further configured to store the individual trade data elements in a trade data repository (125). The trade data repository (102) may be a database, a spreadsheet, an XML document, a text file, or any other type of data repository. The trade data repository (102) may be of the same type as the trade data source (105), or may be of a different type. Further, multiple trade data repositories (not shown) may be used.

In one or more embodiments, the trade data repository (125) includes billing information, i.e., individual trade data elements that identify a business entity to which money is owed (hereinafter the "seller"), and the amount of money to be billed. In one or more embodiments, the billing information originates from the trade data source (105), via the aforementioned messaging components. Alternatively, any other source of billing information may be used. Regardless of the specific source of the billing information, the billing information may be used to pay the bill.

Specifically, in one or more embodiments, a bill management interface (130) is configured to obtain billing information from the trade data repository (125). The bill management interface (130) may be a website, a stand-alone application, a module in an accounting application, or any other type of interface for managing bills. Further, the bill management interface (130) is configured to use the billing information to pay the bill via the seller's bill payment interface (140). For example, the bill payment interface (140) may be a bill payment website. In one or more embodiments, the bill management interface (130) is configured to pay multiple bills (i.e., for the same or different sellers) simultaneously, via multiple bill payment interfaces (not shown), thereby reducing the time and effort required to pay multiple bills.

In one or more embodiments, the bill management interface (130) is configured to communicate directly with the bill payment interface (140). Alternatively, the bill management interface (130) may be configured to use a payment processing service (135) as an intermediary. The payment processing service (135) is remote to both the bill management interface (130) and the bill payment interface (140), and may serve many different functions. For example, the payment processing service (135) may act as a banking service, whereby overpayments accrue interest and may be used to pay subsequent bills. Further, the payment processing service (135) may act as an intermediary for funds transfers (e.g., automated clearing house (ACH) transactions), with the added protection of balance verification.

However the bill management interface (130) and the bill payment interface (140) are configured to communicate, the bill payment interface (140) may further be configured to store information about paid bills in the trade data source (105). Thus, in one or more embodiments, the system shown in FIG. 1 provides a fully electronic billing cycle, from bill presentment to bill payment. However, the messaging components described herein may be used for purposes other than bill presentment.

Figure 2:
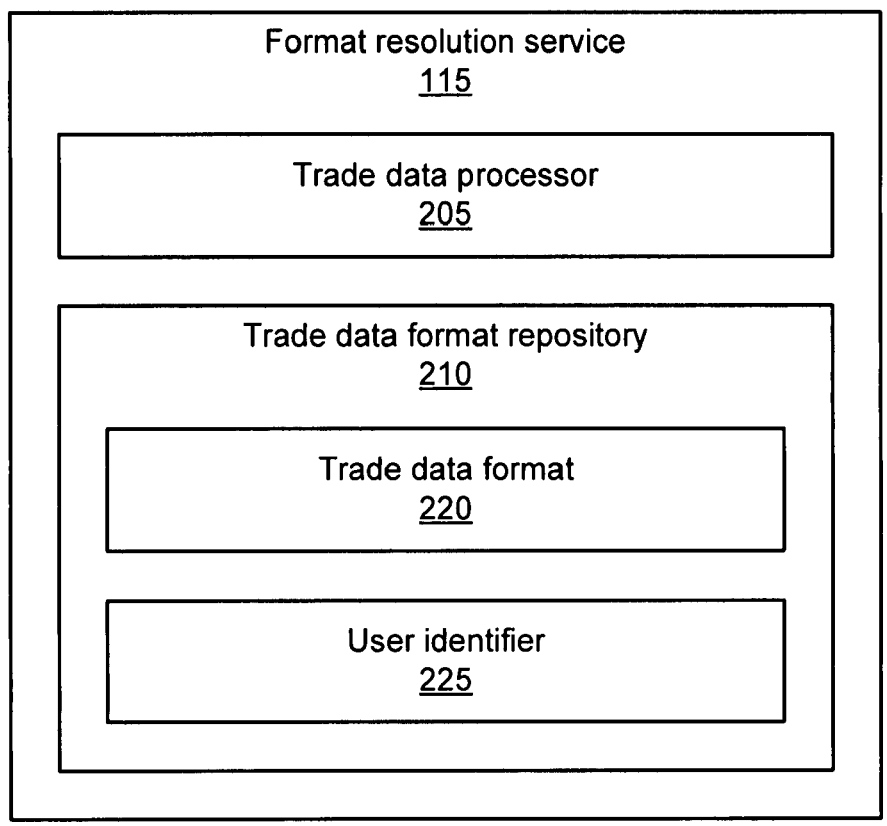
FIG. 2 shows an expanded diagram of a format resolution service in accordance with one or more embodiments of the invention.

Returning to discussion of electronic messaging of trade data, FIG. 2 shows an expanded diagram of the format resolution service (115 in FIG. 1) in accordance with one or more embodiments of the invention. The format resolution service (115) includes a trade data format repository (210) configured to store one or more known trade data formats (e.g., trade data format (220)). Further, the trade data format repository (210) may include one or more user identifiers (e.g., user identifier (225)) associated with the trade data format(s). In one or more embodiments, the user identifiers indicate which trade data format(s) a particular user is registered and/or expected to use. Further, user identifiers may be used to identify contributors of known formats. In one or more embodiments, user metadata (not shown) is also stored, providing user information such as company, business unit, industry, job title, or any other type of information about the user. As discussed below, user metadata may be used to categorize the information and/or determine a suggested trade data format. The trade data format repository (210) may be a database, a spreadsheet, an XML document, a text file, or any other type of data repository.

Further, the format resolution service (115) includes a trade data processor (205) configured to receive information from the trade data interpreter (122 in FIG. 1), determine a known trade data format based on the information, and transmit the known trade data format to the trade data interpreter (122) in response to the information. The known trade data format may be determined using pattern recognition, by searching for a provided user identifier in the trade format repository (115), or by any other method that allows a trade data format to be resolved. Identifying a known trade format is discussed in detail below. The trade data processor (205) may be implemented as software, hardware, or any combination thereof.

Figure 3:
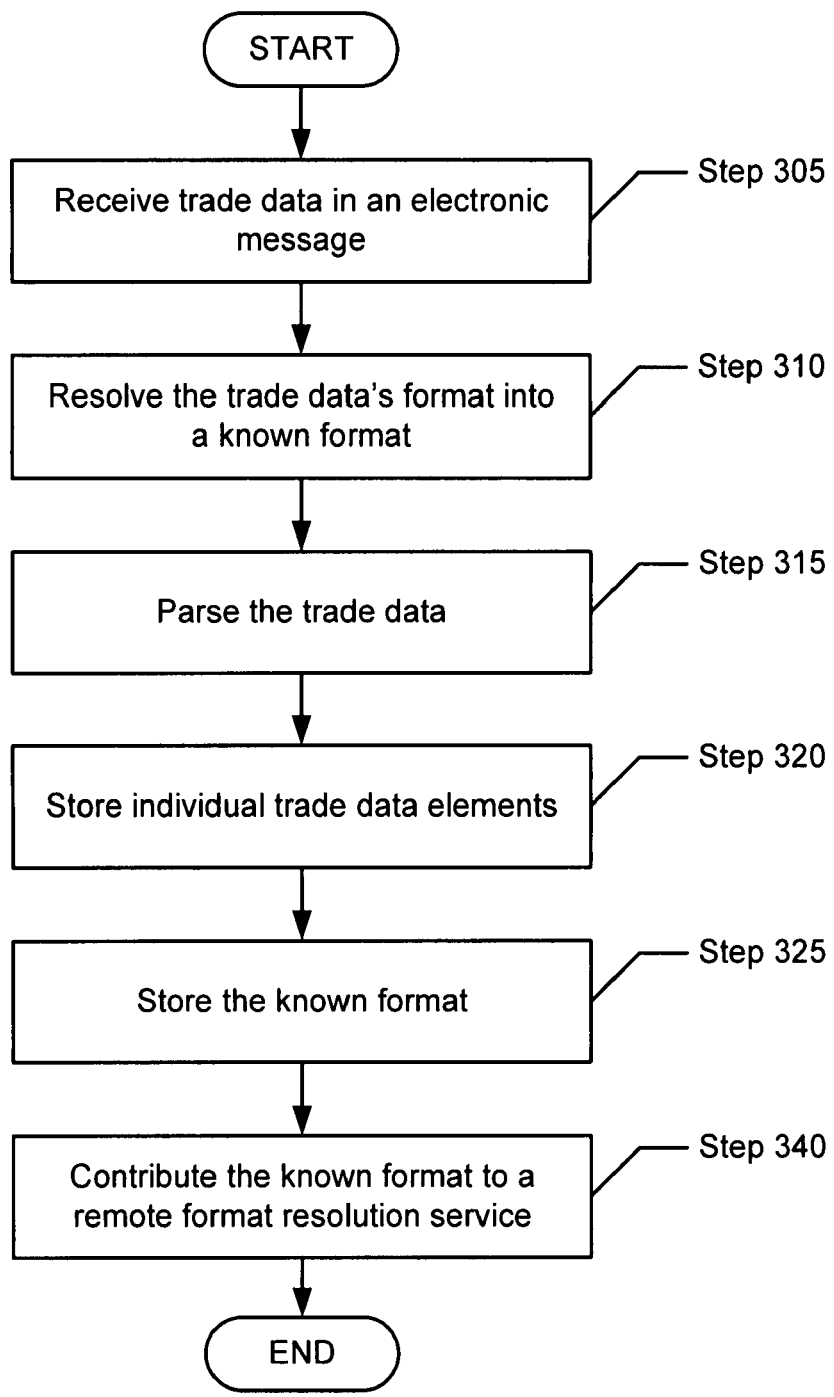
FIG. 3 shows a flowchart of a method for electronic messaging of trade data in accordance with one or more embodiments of the invention.

FIG. 3 shows a flowchart of a method for electronic messaging of trade data in accordance with one or more embodiments of the invention. In one or more embodiments, one or more of the steps shown in FIG. 3 may be omitted, repeated, and/or performed in a different order. Further, one or more of the steps may be performed concurrently. Accordingly, the specific arrangement of steps shown in FIG. 3 should not be construed as limiting the scope of the invention.

Initially, in Step 305, an electronic message containing trade data is received. As noted above, the trade data may have an unknown format. Accordingly, in Step 310, the trade data's format may be resolved into a known format. The known format includes guidelines for obtaining individual trade data elements from the trade data. For example, the known format may indicate line and character positions, enclosing tags (e.g., HTML or XML tags), encryption schemes, etc., depending on the specific format used. Some methods for resolving trade data formats are discussed in detail below with respect to FIGS. 4A-4D.

In Step 315, the known format of the trade data is used to parse the trade data to obtain individual trade data elements encoded therein. Specifically, parsing the trade data involves using the guidelines contained in the known format to locate and obtain individual trade data elements in the trade data. In one or more embodiments, only a subset of the individual trade data elements encoded in the trade data are obtained. For example, the recipient may not need all of the trade data provided by the sender, and accordingly may choose to ignore any unneeded individual trade data elements.

In one or more embodiments, a user is prompted (not shown) to accept, reject, and/or modify the known format prior to parsing the trade data. Further, the prompt may include information about the logic used to arrive at the suggestion. For example, the prompt may indicate that the suggestion was derived using trade data formats provided by other users in the same company, business unit, industry, job description, etc. In one or more embodiments, such detailed suggestions are made possible by user metadata stored in a trade data format repository, as discussed above.

In Step 320, the obtained individual trade data elements are stored in a trade data repository. Storing the individual trade data elements in a trade data repository makes them available for other uses, such as paying bills, generating reports, preparing invoices, etc. In Step 325, the known format itself may be stored, either in the trade data repository or elsewhere. Specifically, the known format may be stored in association with a sender identifier, thereby facilitating the processing of subsequent electronic messages from the same sender. By storing the known format, it may no longer be necessary to resolve the format when subsequent electronic messages are received from the same sender.

Further, in Step 340, the known format may be contributed to a remote format resolution service (e.g., format resolution service (115) of FIG. 1). For example, a suggested format that is modified by a user may be updated at the format resolution service. Further, trade data formats that could not be resolved using automated processing and/or where the configuration does not allow for resolution may be manually entered and contributed by users. Thus, the known format is made accessible to other users. In one or more embodiments, a business entity governing the format resolution service may require that any users accessing the format resolution service also contribute any new known formats as they become available. In other words, the format resolution service may act as the center of an opt-in community of trade data format contributors. As discussed below, one or more embodiments of the invention may rely on user-contributed trade data formats to provide format resolution services.

As discussed above, to obtain the known format, some form of format resolution may be required (i.e., Step 310 of FIG. 3). FIGS. 4A-4D show flowcharts of methods for resolving trade data formats in accordance with one or more embodiments of the invention. The specific method used may depend on many factors, such as implementation decisions, the type of electronic message received, availability (or lack thereof) of a remote format resolution service, etc. Accordingly, in one or more embodiments, one or more of the options discussed below may not be used, or may only be used under certain conditions.

Figure 4A:
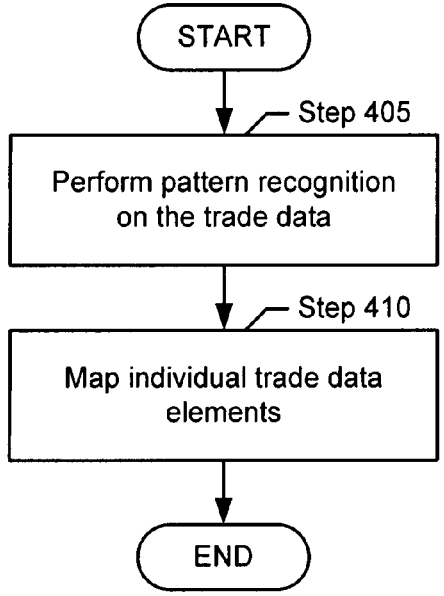
FIGS. 4A-4D show flowcharts of methods for trade data format resolution in accordance with one or more embodiments of the invention.

In FIG. 4A, the known format is obtained using pattern recognition. Specifically, in Step 405, pattern recognition is performed on the trade data. Pattern recognition involves processing the trade data to identify the locations of individual trade data elements in the trade data. For example, pattern recognition may involve searching the trade data for keywords such as "amount," "address," "subtotal," "from," "patient," "due date," etc. The specific keywords used may vary depending on the type of trade data being processed. Characters following the keywords are treated as values associated with the keywords.

Alternatively, a specific set of keywords may not be known. In such cases, pattern recognition may involve comparing the most recently received trade data with previously received trade data from the same sender, whereby identically situated characters are treated as keywords. As another example, pattern recognition may involve searching for text separated by special characters, such as colons, semicolons, brackets, commas, parentheses, etc. In view of the above, those skilled in the art will appreciate that many different types of pattern recognition may be used that remain within the scope of the invention.

In one or more embodiments, pattern recognition involves comparing the trade data to user-contributed trade data formats. Specifically, pattern recognition may be used to identify similarities between portions of the trade data and one or more known formats. Further, a subset of known formats to use in the pattern recognition may be isolated based on user metadata. For example, if the trade data is associated with a particular industry, known formats contributed by users in the same industry may be used. In one or more embodiments, filtering known formats in this manner increases the likelihood that the format is accurately resolved. The resolved format (or combined formats) may then be suggested to the user as a potential mapping of trade data elements. The user may then have the option to accept, decline, and/or modify the suggested mapping.

In view of the above, those skilled in the art will appreciate that pattern recognition is most successful when a large number of known formats are available for use in pattern recognition. That is, the logic governing the pattern recognition typically operates best with a large set of reference data. Thus, enforcing user contributions to a format resolution service may not only increase the number of specific known formats, but also increase the likelihood that a completely unknown format can be resolved using pattern recognition.

In Step 410, once pattern recognition is complete, a mapping of individual trade data elements in the trade data is generated. Specifically, pattern recognition provides the necessary location information to generate the mapping. The known format then includes the generated mapping along with any other information (e.g., encryption information) necessary to obtain individual trade data elements from the trade data.

Figure 4B:
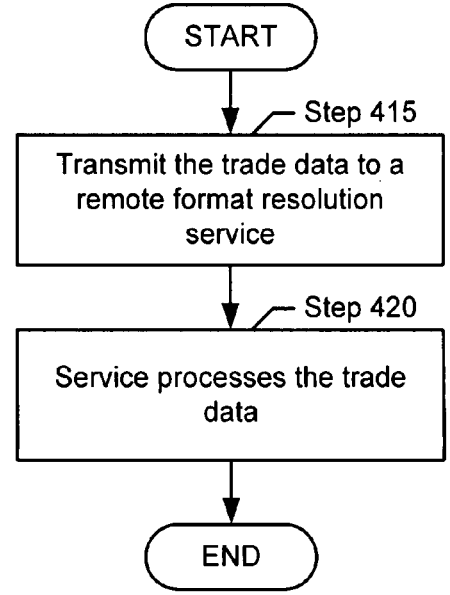

In FIG. 4B, the known format is obtained via a remote format resolution service (e.g., format resolution service (115) of FIG. 1). Specifically, in Step 415, trade data is transmitted to the remote format resolution service. In Step 420, the remote format resolution service processes the trade data to obtain the known format. For example, the remote format resolution service may perform pattern recognition as discussed above with respect to FIG. 4A. Whatever specific method the remote format resolution service uses to obtain the known format, the remote format resolution service then transmits the known format in response to the trade data.

Figure 4C:
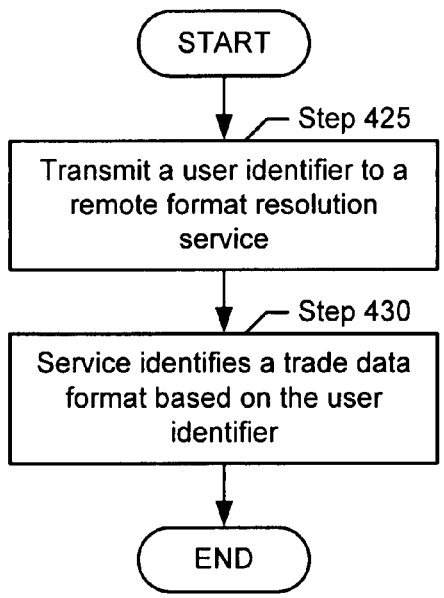

Alternatively, as shown in FIG. 4C, the remote format resolution service may obtain the known format based on a user identifier, i.e., information identifying the sender of the original electronic message. Specifically, in Step 425, the user identifier is transmitted to the remote format resolution service. In Step 430, the remote format resolution service obtains a known format corresponding to the user identifier. For example, as discussed above with respect to FIG. 2, the remote format resolution service may include a trade data format repository, where trade data formats are associated with user identifiers. The remote format resolution service then transmits the known format in response to the user identifier.

Figure 4D:
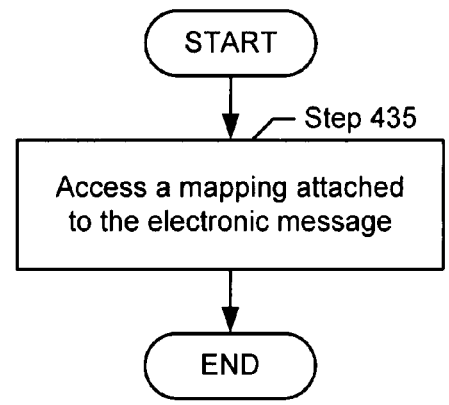

In FIG. 4D, a mapping of individual trade data elements in the trade data is attached to the electronic message. Thus, in Step 435, obtaining the known format simply involves accessing the mapping. The mapping may then be used to obtain the individual trade data elements.

It should be noted that FIGS. 4A-4D merely describe examples of processing an electronic message to obtain a known format of trade data. Many different methods exist that remain within the scope of the invention. Accordingly, embodiments of the invention are not limited by the examples shown in FIGS. 4A-4D.

Figure 5A:
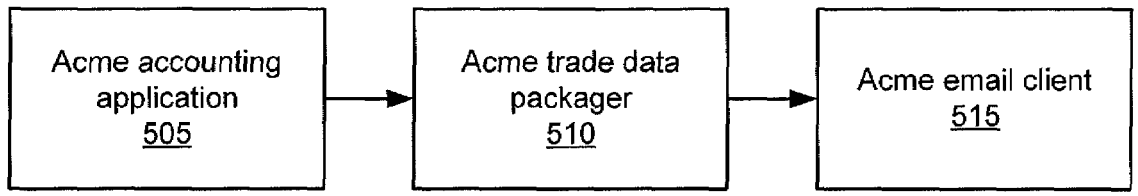
FIGS. 5A-5C show an example of electronic messaging of trade data in accordance with one or more embodiments of the invention
Figure 5B:
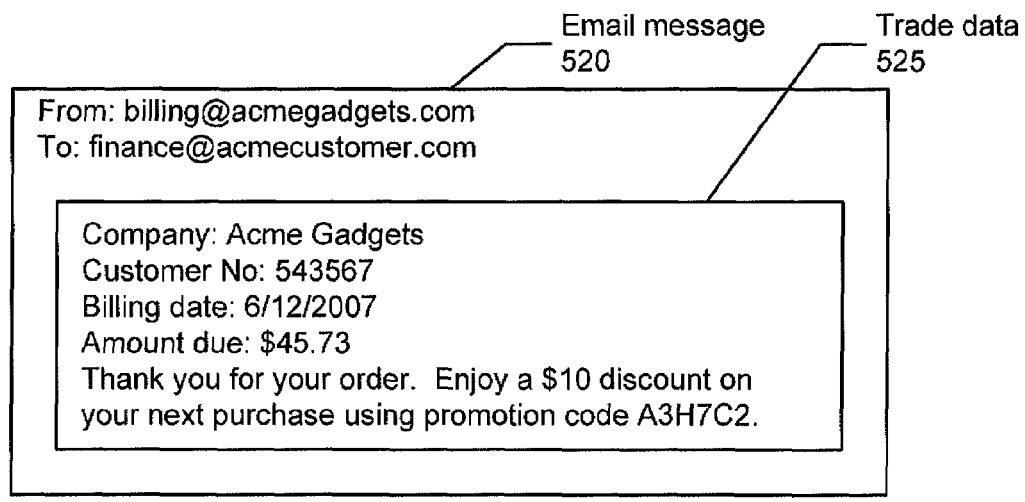
Figure 5C:
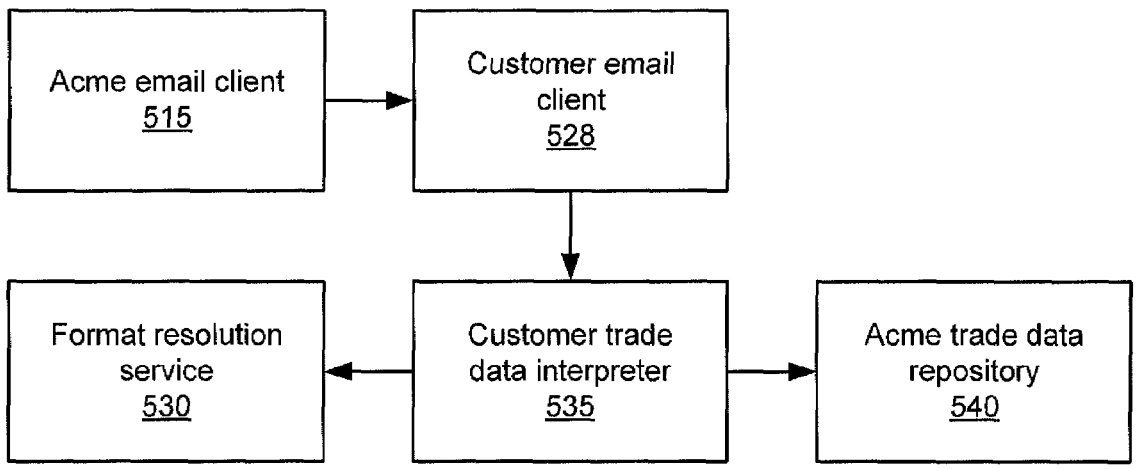

FIGS. 5A-5C show an example of electronic messaging of trade data in accordance with one or more embodiments of the invention. FIGS. 5A-5C and corresponding discussion below are provided for exemplary purposes only, and should not be construed as limiting the scope of the invention.

In the example shown in FIGS. 5A-5C, a customer has purchased $45.73 worth of gadgets from Acme Gadgets. Information about the purchase is stored in an Acme accounting application (505). The Acme accounting application (505) is communicatively coupled (in this case, directly) with an Acme trade data packager (510), which is a third-party module of an Acme email client (515). To generate a bill for the customer, the Acme trade data packager (510) obtains information about the bill from the Acme accounting application (505), formats the information, and places the information within an email message using functionality of the Acme email client (515).

FIG. 5B shows one example of an email message (520) that may result from the process described above. The email message includes a sender identifier (i.e., the "from" email address), a recipient identifier (i.e., the "to" email address), and trade data (525) corresponding to the bill. Specifically, the trade data (525) includes the billing company's name, the customer's customer number, the date of the bill, and the amount due. The trade data (525) also includes unstructured trade data, in the form of the sentence, "Thank you for your order. Enjoy a $10 discount on your next purchase using promotion code A3H7C2."

As shown in FIG. 5C, the Acme email client (515) transmits the email message (520) to the customer email client (528). A customer trade data interpreter (535), which is a third-party module of the customer email client (528), is configured to process all email messages received at the "finance@acmecustomer.com" email address.

How the customer trade data interpreter (535) processes the email message (520) may vary. In one or more embodiments, the customer trade data interpreter (535) performs pattern recognition on the email message (520) to locate text preceded by the terms "company," "billing date," "amount due," etc. Alternatively, pattern recognition may be performed by comparing the trade data (525) to known formats associated with the gadget industry or invoices in general. The email message (520) may also be compared to previous email messages (not shown) from the "billing@acmegadgets.com" email address, to identify a pattern. The pattern recognition may result in a mapping of the individual trade data elements. For example, pattern recognition may determine that the amount due is located on the fourth line of the trade data (525).

Alternatively, the customer trade data interpreter (535) may forward the email message (520), or possibly just the trade data (525) to a format resolution service (530). The format resolution service (530) may then perform pattern recognition on the trade data, as described above, or may match the "billing@acmegadgets.com" email address with a known format. In any case, the format resolution service (530) responds to the customer trade data interpreter (535) with the known format.

Having obtained the known format, the customer trade data interpreter (535) then uses the known format to obtain one or more of the individual trade data elements contained in the trade data (525), and stores the individual trade data element (s) in a customer trade data repository (540). The individual trade data element(s) are then available for access by another application, such as a bill management interface (e.g., bill management interface (130) of FIG. 1).

If the known format was not obtained from the format resolution service (530), the customer trade data interpreter (535) contributes the known format to the format resolution service (530). Thus, other customers receiving email messages from the "billing@acmegadgets.com" email address may use the format resolution service (530) to resolve the email messages' format. Acme Gadgets may also choose to contribute the format to the format resolution service (530) itself, thereby facilitating electronic bill payment practices for Acme Gadgets' customers. Embodiments of the invention allow businesses to adopt trade data formats without worrying about the trade data formats used by their business partners. Further, by providing automated resolution of trade data formats, embodiments of the invention reduce or eliminate the amount of manual data entry required for recipients of the trade data. The provision of a format resolution service further facilitates electronic messaging of trade data by acting as a cumulative repository and processor of trade data formats for any number of businesses. Businesses may subscribe to the format resolution service and contribute trade data formats as they become known, thereby creating a robust, centralized trade data communications network.

Figure 6:
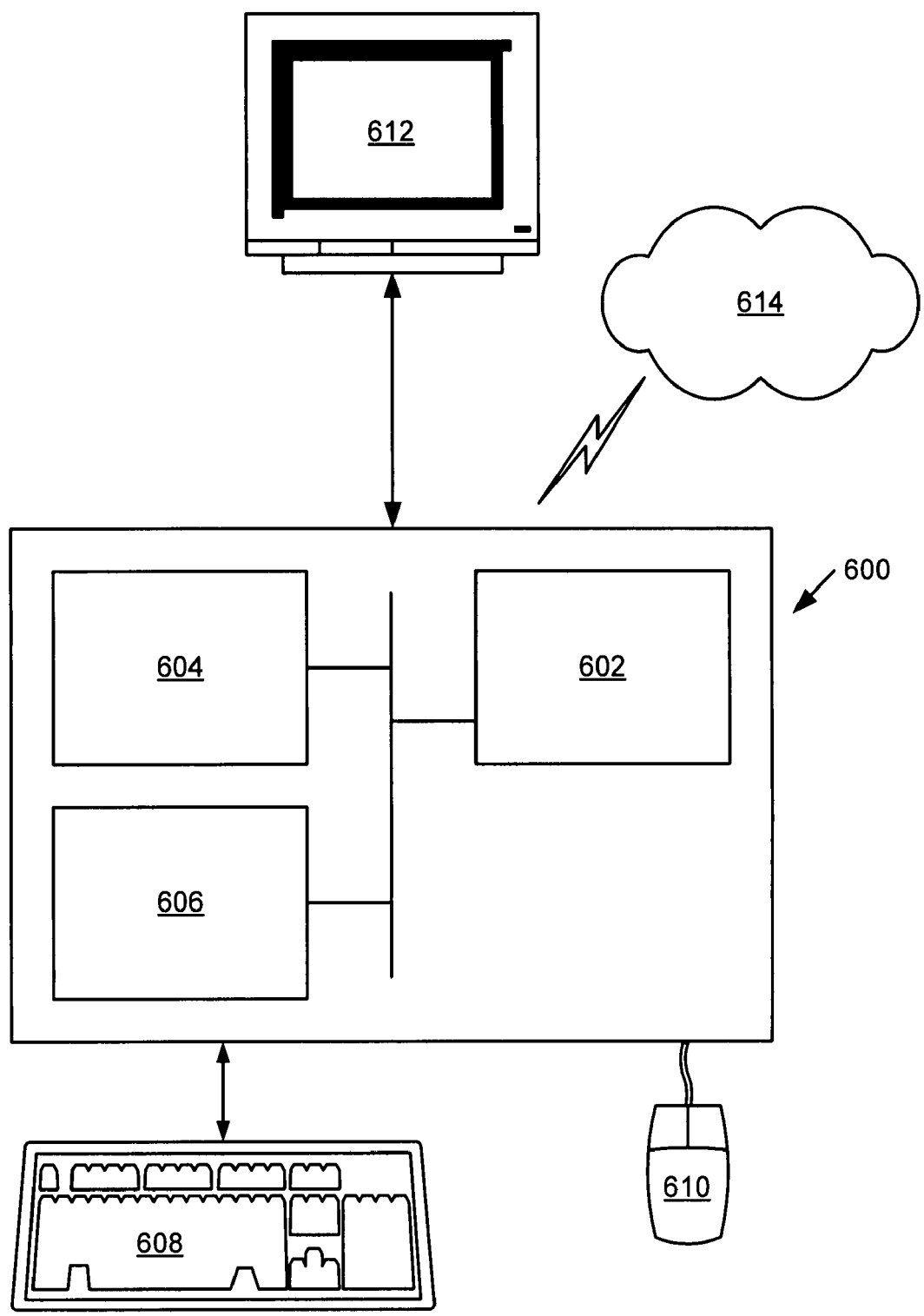
FIG. 6 shows a diagram of a computer system in accordance with one or more embodiments of the invention.

Embodiments of the invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) may be connected to a network (614) (e.g., a local area network (LAN), a wide area network (WAN) such as the Internet, any other type of network, or any combination thereof) via a network interface connection (not shown). Those skilled in the art will appreciate that these input and output means may take other forms.

Further, those skilled in the art will appreciate that one or more elements of the aforementioned computer system (600) may be located at a remote location and connected to the other elements over a network. Further, embodiments of the invention may be implemented on a distributed system having a plurality of nodes, where each portion of the invention (e.g., trade data source, trade data packager, sender data messenger, recipient data messenger, trade data interpreter, format resolution service, trade data repository, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for electronic messaging of trade data, comprising:
   receiving, by an accounting software application (ASA) operated by a first buyer and executing on a hardware device, an e-mail comprising a first bill issued by a seller, wherein the first bill comprises a first set of unstructured trade data having an unknown format, and wherein the unstructured trade data comprises individual trade data elements;
   sending, by the ASA and in response to receiving the e-mail, the first bill to a format resolution service (FRS) using a computer network operatively connecting the hardware device and the FRS;
   identifying, by the FRS and in response to receiving the first bill, a second bill issued by the seller to a second buyer and comprising a second set of unstructured trade data;
   determining, by the FRS and using the first and second bill, an encryption scheme used by the seller;
   identifying, by the FRS, a sequence of characters identically situated in both the first set of unstructured trade data and the second set of unstructured trade data;
   designating, by the FRS, the sequence of characters as a keyword;
   generating, by the FRS, a mapping between the keyword and a trade data element following the keyword in the first set of unstructured trade data;
   sending, by the FRS, the mapping and the encryption scheme to the ASA;
   obtaining, by the ASA, the trade data element from the first bill by parsing the first set of unstructured trade data according to the mapping;
   storing the trade data element in a trade data repository;
   obtaining, by the ASA, the trade data element from the trade data repository; and
   paying, by the ASA, a plurality of bills simultaneously by accessing a bill payment interface, wherein the plurality of bills comprises the first bill.

2. The method of claim 1, further comprising:
   contributing the mapping to the FRS.

3. The method of claim 1, further comprising:
   applying, by the ASA, the mapping received from the FRS to a subsequent e-mail issued by the sender to the first buyer.

4. The method of claim 1, further comprising:
   displaying the mapping to the buyer; and
   receiving, in response to the displaying the mapping, a validation of the mapping from the buyer prior to parsing the first set of unstructured trade data.

5. A system comprising:
   an accounting software application (ASA) executing on a hardware device and comprising functionality to:
      receive an e-mail comprising a first bill issued by a seller, wherein the first bill comprises a first set of unstructured trade data having an unknown format, and wherein the unstructured trade data comprises individual trade data elements;
      obtain a trade data element from the first bill by parsing the first set of unstructured trade data according to a mapping; and
      pay a plurality of bills simultaneously by accessing a bill payment interface, wherein the plurality of bills comprises the first bill;
   a trade data format repository configured to store the trade data element; and
   a format resolution service (FRS) operatively connected to the hardware device over a computer network and comprising functionality to:
      receive the first bill from the ASA;
      identify, in response to receiving the first bill, a second bill issued by the seller to a second buyer and comprising a second set of unstructured trade data;
      determine, using the first and second bill, an encryption scheme used by the seller;
      identify a sequence of characters identically situated in both the first set of unstructured trade data and the second set of unstructured trade data;
      designate the sequence of characters as a keyword;
      generate the mapping between the keyword and the trade data element following the keyword in the first set of unstructured trade data; and
      send the mapping and the encryption scheme to the ASA.

6. A computer readable storage medium comprising executable instructions for electronic messaging of trade data, the instructions comprising functionality for:
   receiving, by an accounting software application (ASA) operated by a first buyer and executing on a hardware device, an e-mail comprising a first bill issued by a seller, wherein the first bill comprises a first set of unstructured trade data having an unknown format, and wherein the unstructured trade data comprises individual trade data elements;
   sending, by the ASA and in response to receiving the e-mail, the first bill to a format resolution service (FRS)

using a computer network operatively connecting the hardware device and the FRS,
wherein the FRS is configured to:
  identify a second bill issued by the seller to a second buyer and comprising a second set of unstructured trade data;
  determine, using the first and second bill, an encryption scheme used by the seller;
  identify a sequence of characters identically situated in both the first set of unstructured trade data and the second set of unstructured trade data;
  designate the sequence of characters as a keyword;
  generate a mapping between the keyword and a trade data element following the keyword in the first set of unstructured trade data; and
  send the mapping and the encryption scheme to the ASA;
obtaining, by the ASA, the trade data element from the first bill by parsing the first set of unstructured trade data according to the mapping; and
paying, by the ASA, a plurality of bills simultaneously by accessing a bill payment interface, wherein the plurality of bills comprises the first bill.

7. The computer readable storage medium of claim 6, further comprising executable instructions for:
  contributing the mapping to the FRS.

8. The computer readable storage medium of claim 6, further comprising executable instructions for:
  applying the mapping received from the FRS to a subsequent e-mail issued by the seller to the first buyer.

9. The computer readable storage medium of claim 6, further comprising executable instructions for:
  displaying the mapping to the buyer; and
  receiving, in response to the displaying the mapping, a validation of the mapping from the buyer prior to parsing the first set of unstructured trade data.

* * * * *